United States Patent [19]

Staerzl

[11] Patent Number: 4,733,644
[45] Date of Patent: Mar. 29, 1988

[54] ENGINE OVERSPEED CONTROL CIRCUIT WITH DEFEAT DETECTION

[75] Inventor: Richard E. Staerzl, Fond du Lac, Wis.

[73] Assignee: Brunswick Corporation, Skokie, Ill.

[21] Appl. No.: 76,786

[22] Filed: Jul. 23, 1987

Related U.S. Application Data

[63] Continuation-in-part of Ser. No. 866,163, May 22, 1986, Pat. No. 4,712,527.

[51] Int. Cl.$^4$ .............................................. F02D 45/00
[52] U.S. Cl. ..................................... 123/352; 123/335
[58] Field of Search ............... 123/350, 351, 332, 333, 123/334, 335, 349, 352

[56] References Cited

U.S. PATENT DOCUMENTS

| 971,334 | 9/1910 | Whalen | 123/335 |
| 3,182,648 | 5/1965 | Schneider et al. | 123/335 |
| 3,281,783 | 10/1966 | Adams | 123/351 |

FOREIGN PATENT DOCUMENTS 3301062 6/1984 Fed. Rep. of Germany ...... 123/333

Primary Examiner—Andrew M. Dolinar
Attorney, Agent, or Firm—Andrus, Sceales, Starke & Sawall

[57] ABSTRACT

Engine overspeed control circuitry (200) includes a comparator (206) comparing tachometer voltage against a reference voltage, and disabling the engine above a given speed. The overspeed protection is defeated by blowing a fuse (222) in circuit with a comparator input (212) changing the impedance thereat, which leaves a permanent record of the defeat for subsequent detection.

8 Claims, 4 Drawing Figures

ENGINE OVERSPEED CONTROL CIRCUIT WITH DEFEAT DETECTION

CROSS REFERENCE TO RELATED APPLICATION

This application is a continuation in part of U.S. Application Ser. No. 06/866,163, filed May 22, 1986, now U.S. Pat. No. 4,712,527.

BACKGROUND AND SUMMARY

The invention arose during continuing development efforts in conjunction with the subject matter in the above noted parent application in marine racing implementations.

It is desirable in certain implementations to prevent a marine engine from overspeeding, in order to protect the engine. In other implementations, for example racing, the operator may wish to defeat the overspeed protection, and run the engine at a higher speed. The present invention enables the operator to defeat the overspeed protection, but leaves a permanent record of such defeat for subsequent detection. This is desirable for the operator because it allows him the freedom to choose to defeat the overspeed protection circuitry, for example for racing, and is desirable for the manufacturer because it leaves a record that the operator has chosen to extend the engine beyond warranty provisions, etc.

DETAILED DESCRIPTION

Figure 1:
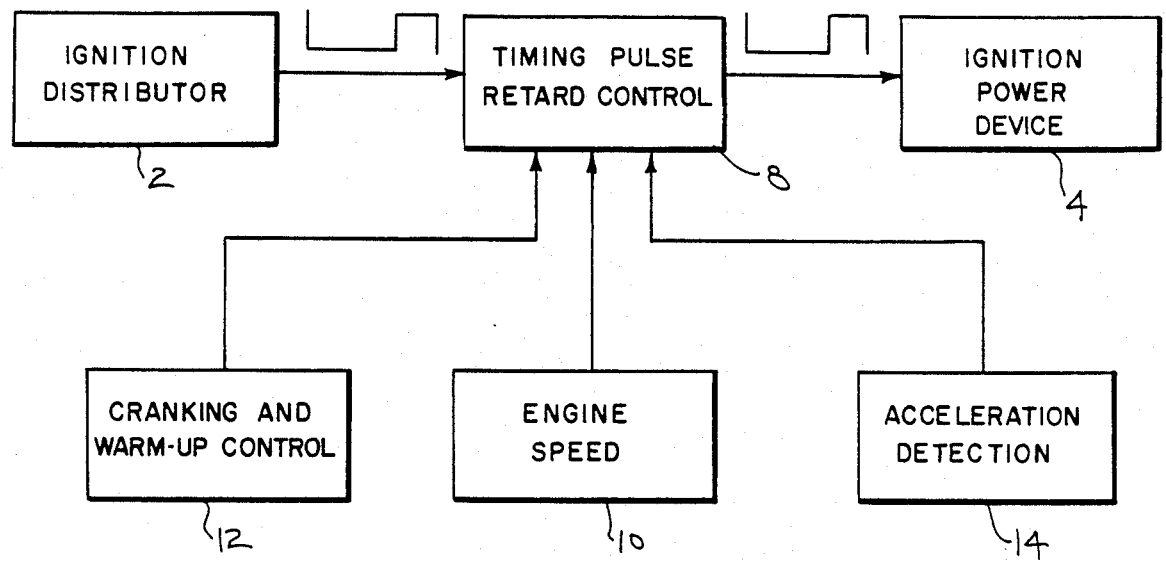
FIG. 1 is a schematic block diagram of an engine idle stabilization timing circuit in accordance with the above noted parent application.
Figure 2:
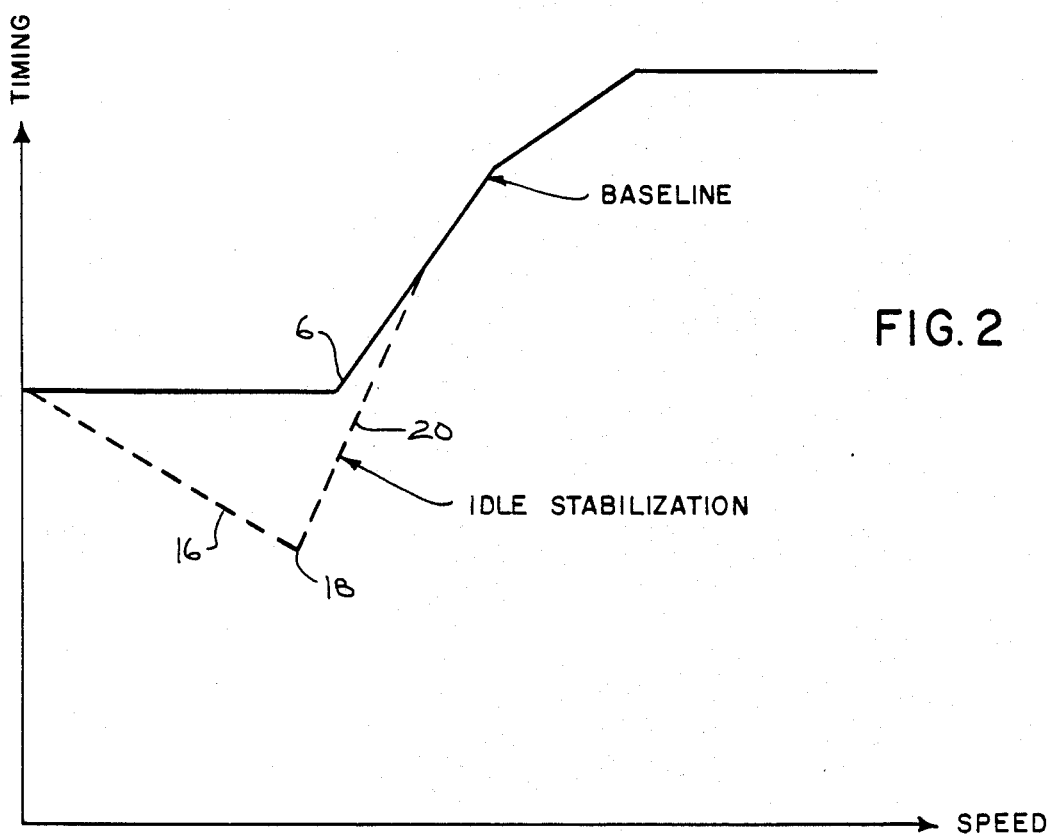
FIG. 2 is a graph of engine speed as the abscissa versus relative timing advancement as the ordinate in accordance with the above noted parent application.

FIG. 1 shows an ignition distributor 2 supplying ignition pulses to an ignition power device 4 which in turn supplies the ignition timing pulses according to a baseline timing curve, FIG. 2, for controlling spark ignition in an internal combustion engine. FIG. 2 illustrates timing advancement as a function of engine speed and illustrates baseline timing curve 6. This baseline timing curve is typically pre-programmed into ignition power device 4, for example the Dolphin ignition system in Mercury Marine racing applications, Mercury Marine Part No. 390-7804-1.

In the above noted parent application, the ignition timing pulses either into or out of ignition power device 4 are variably delayed in order to provide idle stabilization. In FIG. 1, the ignition timing pulses are delayed by a timing pulse retard control circuit 8 providing a variable delay according to an engine speed responsive circuit 10. Cranking and warmup control circuitry 12 and acceleration detection circuitry 14 are also provided, to be more fully described.

In the preferred embodiment of the parent application, at engine speeds up to about 900 rpm, FIG. 2, the ignition timing pulses are variably delayed relative to a top dead center position of the engine to retard engine timing from baseline curve 6. The relative timing delay increases with increasing engine speed as shown along dashed line negative slope 16. The relative timing delay is at a maximum at inflexion point 18 at 900 rpm engine speed. The relative timing delay thus increases with increasing engine speed up to such predetermined speed. At engine speed higher than 900 rpm, the relative timing delay decreases with increasing engine speed along positive dashed line slope 20 which is steeper than negative slope 16. The decreasing relative timing delay along steep slope 20 merges with the baseline timing curve 6 at about 2,200 rpm, the steep slope 20 providing a gradual merging transition with the baseline timing curve to eliminate surging.

Idle stabilization is provided as follows. At speeds below 900 rpm, e.g. 600 rpm, an increase in engine speed increases the relative timing delay, i.e., rightwardly downwardly along negative slope 16, which increased delay further retards engine timing, which further retarded timing slows engine speed, hence providing self-stablization. Likewise, a decrease in engine speed decreases the relative timing delay, i.e., leftwardly upwardly along negative slope 16, and thus advances engine timing, which advanced timing increases engine speed, hence providing self-stabilization. As above noted, the rate of delay increase with increasing engine speed up to the predetermined 900 rpm speed is less than the rate of delay decrease with increasing engine speed above the predetermined 900 rpm speed such that the slope 20 of the latter is steeper than the slope 16 of the former, with slopes meeting at the maximum delay 18 corresponding to the predetermined 900 rpm speed.

Timed ignition is provided relative to a top dead center position in a cycle of revolution of the engine. In the preferred embodiment of the parent application, the idle stabilization circuitry delays the ignition pulses by a fixed absolute time interval up to a predetermined engine speed such as 900 rpm. Such fixed absolute time interval becomes a greater percentage of the time needed for the engine to complete a cycle of revolution as engine speed increases up to the predetermined speed. That is, at low engine speeds, the period or time for one revolution is greater, and the fixed delay interval is a small fraction thereof. As engine speed increases, the period or time for a revolution is smaller, and the fixed delay interval becomes a greater fraction thereof. Hence, the fixed absolute time delay interval becomes a greater number of degrees after top dead center as engine speed increases. Thus, the delay of the ignition timing pulses relative to the top dead center position increases along negative slope 16 with increasing engine speed up to the predetermined speed, to increasingly retard engine timing from the baseline curve to a maximum delay at transition point 18 at the predetermined speed. At speeds above the predetermined speed, the absolute time interval of delay is decreased with increasing engine speed to decrease delay of ignition timing pulses relative to the top dead center position, to advance engine timing along slope 20 to merge with the baseline curve.

Figure 3:
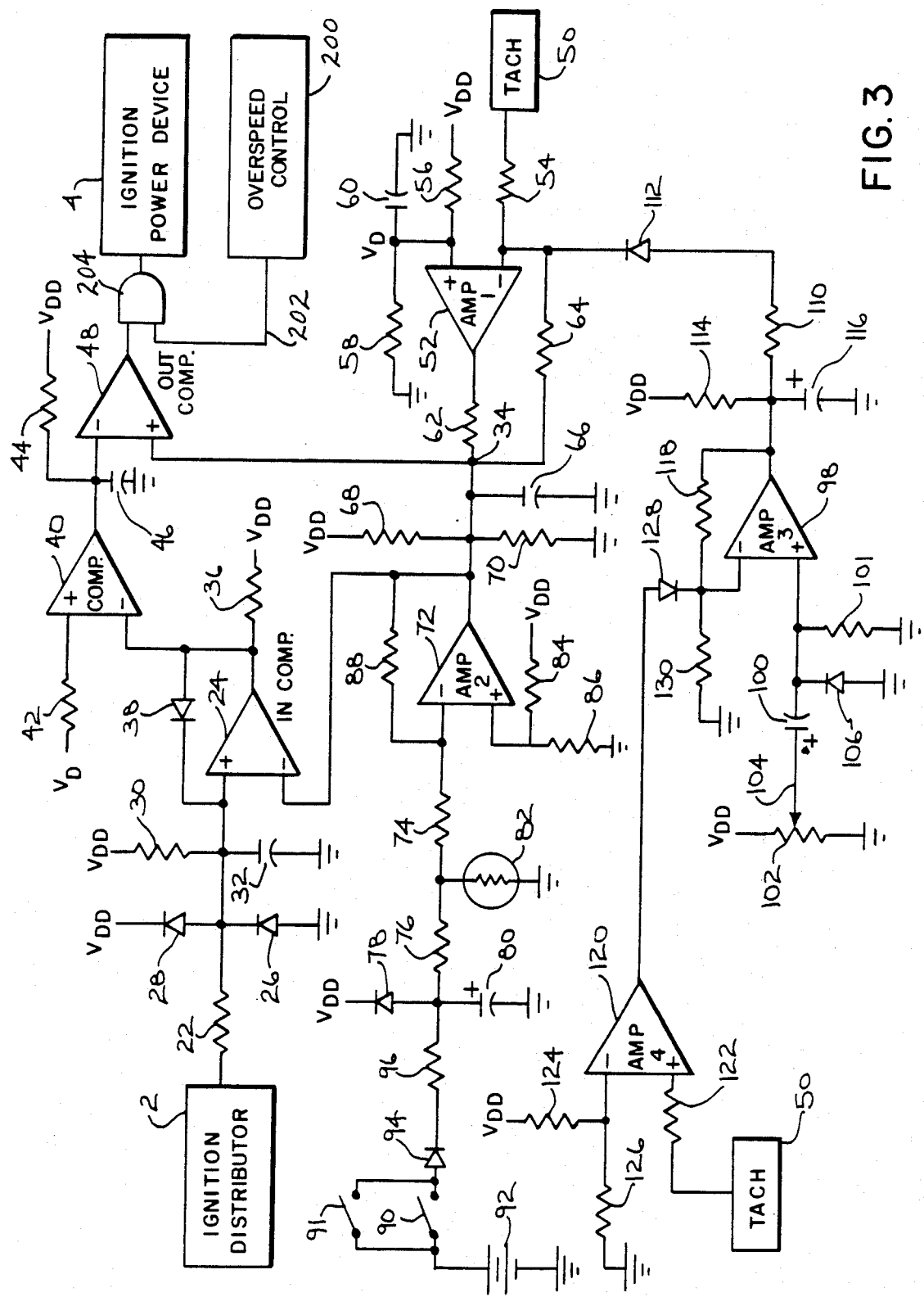
FIG. 3 is a circuit diagram of circuitry in accordance with the above noted parent application, and additionally schematically shows overspeed control circuitry in accordance with the present invention.

Referring to FIG. 3, ignition pulses from distributor 2 are supplied through resistor 22 to the plus input as a comparison input of comparator 24. A pair of diodes 26 and 28 are provided in series between ground and a fixed voltage source $V_{DD}$ and provide voltage clipping and noise suppression. Resistor 30 and capacitor 32 provide an RC timing circuit. The minus input of comparator 24 is used as the reference voltage input and is connected to node 34. The output of comparator 24 is tied through resistor 36 to the voltage supply $V_{DD}$ and is also fed back through diode 38 to provide positive switching of comparator 24. When the incoming ignition pulse from distributor 2 is low, capacitor 32 discharges through resistor 22. When the incoming ignition pulse transitions high at a leading edge, capacitor 32 can no longer discharge through resistor 22 and instead is charged from $V_{DD}$ through resistor 30. When the voltage at the comparison plus input of comparator 24 rises above the voltage at the minus reference input, or above a given threshold value relative thereto, the output of comparator 24 goes high. The leading edge of the ignition timing pulse is delayed by the RC time constant of RC timing circuit 30, 32.

The output of comparator 24 is connected to the minus input as a comparison input of intermediate comparator 40. The plus input of comparator 40 is used as the reference input and is connected through resistor 42 to a voltage supply $V_D$ which is less than $V_{DD}$ and is obtained from voltage divider network 56, 58, to be described. When the output of comparator 24 goes high, such high state at the minus input of comparator 40 causes the output of comparator 40 to go low. Resistor 44 and capacitor 46 connected between the voltage supply and ground provide a second RC timing circuit. Capacitor 46 is discharged by the low state of the output of comparator 40.

The output of comparator 40 is connected to the minus input as a comparing input of an output comparator 48. The plus input of comparator 48 is used as the reference input and is connected to node 34. When the output of intermediate comparator 40 goes low and discharges capacitor 46, the voltage at the minus input of comparator 48 drops below the voltage at the reference plus input, or lower than a given threshold value relative thereto, and the output of comparator 48 goes high. The output of comparator 48 is connected to the ignition power device 4, for example the above noted Dolphin ignition system in a Mercury Marine Merc Cruiser line. The leading positive-going edge of the ignition pulse from distributor 2 has thus been processed through input comparator 24, intermediate comparator 40 and output comparator 48 to provide a leading positive-going ignition pulse edge to ignition power device 4 which has been delayed by RC timing circuit 30, 32.

When the ignition pulse from distributor 2 transitions low at its trailing edge, such low state discharges capacitor 32 substantially instantaneously through resistor 22. This low state causes the voltage at the comparing plus input of comparator 24 to drop below the voltage at the minus reference input from node 34, or below a given threshold value relative thereto, and the output of comparator 24 goes low. This low state presents a low voltage at the minus comparing input of comparator 40 less than the voltage at the reference plus input, or less than a given threshold value relative thereto, and the output of comparator 40 thus goes high. The high state of the output of comparator 40 prevents capacitor 46 from discharging, and capacitor 46 instead is charged by the voltage supply through resistor 44. The charging time of capacitor 46 delays the rise in voltage at the minus comparing input of comparator 48, as determined by the RC time constant, and when such voltage increases above the voltage at the plus reference input, or above a given threshold value relative thereto, the output of comparator 48 transitions low. Hence, the negative-going trailing edge of the ignition pulse from distributor 2 has been processed through the comparators and then output to ignition power device 4 as a trailing edge delayed by RC timing circuit 44, 46.

The amount of delay of the leading and trailing edges of the ignition pulses is determined by the voltage at reference node 34. The lower the voltage at node 34, the less the delay. A low voltage at reference node 34 presents a low voltage at the minus reference input of comparator 24, which in turn means that the voltage at the plus comparison input of comparator 24 does not have to rise as high until it reaches the voltage at the minus reference input, or a given threshold value relative thereto, hence causing the output of comparator 24 to transition high. Likewise, a low reference voltage at the plus reference input of output comparator 48 means that the voltage at the minus comparison input of comparator 48 does not have to rise as high to reach the voltage at the plus reference input, or a given threshold value relative thereto, thus causing the output of comparator 48 to transition sooner. Increasing the voltage at node 34 increases the reference input voltage to the input and output comparators 24 and 48 which in turn requires a longer time delay before the respective capacitors 32 and 46 are charged to the switching threshold value for the respective comparator, hence increasing the delay of the respective leading and trailing edge of the ignition pulse. Thus, the lower the voltage at node 34, the more advanced the spark timing, and vice versa.

An engine speed responsive circuit is provided by a tachometer 50 outputting a DC voltage as a function of engine speed and a differential amplifier 52 receiving the speed responsive voltage through resistor 54 at its minus input as a comparison input. The plus input of differential amplifier 52 is used as the reference input and is connected to the voltage supply through the voltage divider network provided by resistors 56 and 58 and filtered by capacitor 60. The output of differential amplifier 52 is connected through resistor 62 to node 34 and through feedback resistor 64 to its minus input for controlling the gain. In the preferred embodiment of the parent application, the offset of the differential amplifier is set so that the tachometer signal does not come into play until about 900 rpm. The output of differential amplifier 52 is normally high when the engine speed is below 900 rpm and the tach voltage at the minus comparing input of differential amplifier 52 is less than the reference voltage at the plus reference input of differential amplifier 52.

The normally high state at the output of differential amplifier 52 prevents capacitor 66 from discharging such that a normally high voltage appears at node 34 set by the voltage divider network provided by resistors 68 and 70. This normally high set voltage provides a fixed reference voltage to the reference inputs of comparators 24 and 48 to provide the above noted fixed absolute time interval of delay of the leading and trailing edges of the ignition pulse.

When the engine speed exceeds 900 rpm, the voltage to the minus comparing input of differential amplifier 52 rises above the voltage at the plus reference input of differential amplifier 52, or above a given threshold value relative thereto, and the output of differential amplifier 52 goes low. This low state of the output of differential amplifier 52 sinks current from capacitor 66, thus reducing the voltage at node 34, hence reducing the relative timing delay of the ignition pulses and advancing engine timing. The output of differential amplifier 52 rapidly goes low to provide the steep slope 20 in FIG. 2. The steeper the slope, the more gradual the merger with the baseline timing curve, and hence the gain of differential amplifier 52 is set accordingly. Zero voltage at node 34 means no relative timing delay and hence the engine timing follows the baseline curve 6.

A second differential amplifier 72 has its minus input as the comparison input connected through resistors 74 and 76 and voltage clipping diode 78 to the voltage supply. A capacitor 80 is connected between ground and the junction of diode 78 and resistor 76. A temperature responsive element 82, such as a negative temperature coefficient thermistor sensing engine temperature, is connected between ground and the junction of resistors 74 and 76. The plus input of differential amplifier 72 is used as the reference input and is connected to the voltage supply through the voltage divider network provided by resistors 84 and 86. The output of differential amplifier 72 is connected to node 34 and also fed back through resistor 88 to the minus input to control gain. When the engine is cold, the resistance of thermistor 82 is high, and the voltage thereacross is high as provided by the voltage divider network provided by resistor 76 and the resistance of thermistor 82, which high state at the minus comparing input of differential amplifier 72 causes the output of differential amplifier 72 to be low. This low state sinks current and discharges capacitor 66 such that node 34 is low, hence providing little or no relative timing delay, and advancing engine timing to the baseline curve. Maximum spark advance is thus provided during warm-up.

As the engine warms up, and its temperature increases above a given value, the resistance of thermistor 82 decreases, which reduces the voltage thereacross, and hence reduces the voltage at the minus comparing input of differential amplifier 72. When the voltage at the minus comparing input of differential amplifier 72 drops below the reference voltage at the plus reference input of differential amplifier 72, or below a given threshold value relative thereto, the output of differential amplifier 72 goes high. This high state at the output of differential amplifier 72 prevents discharge of capacitor 66, and hence increases the voltage at node 34, which in turn provides the above noted relative timing delay along slopes 16 and 20, FIG. 2, as controlled by differential amplifier 52 according to engine speed. Capacitor 80 provides a gradual transition from advanced to retarded timing when the voltage signal at diode 94 is removed either by the thermostatic switch 90 or start switch 91. Capacitor 80 discharges slowly through thermistor 82, and during such slow discharge, capacitor 80 holds up the voltage at the minus comparing input of differential amplifier 72, to in turn provide a slow gradual transition of the output of differential amplifier 72.

During cranking, when starter switch 91 is manually closed by the operator, starting voltage, for example from a starting battery 92, is supplied through diode 94 and resistor 96 and then through resistors 76 and 74 to the minus comparing input of differential amplifier 72 to thus provide a high state thereat whereby the output of differential amplifier 72 is low and hence node 34 is low, and hence maximum spark advance is provided during cranking, regardless of engine temperature. Thermostatic switch 90 is responsive to engine temperature and is closed when the engine is cold to thus complete a circuit from battery 92 and provide maximum spark advance. Thermostatic switch 90 opens when the engine temperature rises above a given level, to enable the above noted retard. In the preferred embodiment, thermistor 82 is selected such that its low resistance state does not sufficiently decrease the starting voltage at the minus comparing input of differential amplifier 72 below that at the plus reference input, or below a given threshold value relative thereto, such that even if the engine is cranked for restart when hot, maximum spark advance is still provided during such restart cranking.

A third differential amplifier 98 has a plus comparing input connected through a differentiating network, provided by capacitor 100 and resistor 101, to a throttle position sensor 102 in the form of a potentiometer connected to the supply voltage. When the throttle is advanced to accelerate the engine, wiper arm 104 of the potentiometer moves upwardly such that the divided voltage thereat increases. Diode 106 provides clipping and protection. The minus input of differential amplifier 98 is used as the reference input and is connected to a reference voltage source which is low below a given elevated engine speed, to be described. The output of differential amplifier 98 is connected through resistor 110 and diode 112 to the minus comparing input of differential amplifier 52, and is also tied to the voltage supply through resistor 114 and filtered by capacitor 116, and is also fed back through resistor 118 to the minus input to control gain. In response to throttle advance calling for rapid acceleration, wiper arm 104 moves upwardly and the voltage at the plus comparing input of differential amplifier 98 rises rapidly above the reference voltage at the minus reference input, or above a given threshold value relative thereto, and the output of differential amplifier 98 rises, whereby the minus comparing input of differential amplifier 52 rises in voltage level, and hence the output of differential amplifier 52 at node 34 goes low, which in turn reduces the relative timing delay and advances the timing to enable quick acceleration.

The acceleration detection and timing advance is disabled above another higher predetermined engine speed, e.g., 3,500 rpm where there is no need for such circuit or its retard or advance. A fourth differential amplifier 120 has its plus comparing input connected through resistor 122 to tachometer 50. The minus input of differential amplifier 120 is used as the reference input and is connected to the voltage supply through the voltage divider network provided by resistors 124 and 126. The offset is selected so that the tach voltage does not come into play until about 3,500 rpm in the preferred embodiment of the parent application. At engine speeds below 3,500 rpm, the voltage at the plus comparing input of differential amplifier 120 is below the voltage at the minus reference input of differential amplifier 120, or lower than a given threshold value relative thereto, and the output of differential amplifier 120 is low. The output of differential amplifier 120 is connected through diode 128 to the minus reference input of differential amplifier 98, and includes a bias resistor 130. The minus reference input of differential amplifier 98 is thus low at engine speeds below 3,500 rpm. When the engine speed increases above 3,500 rpm, the voltage at the plus comparing input of differential amplifier 120 rises above the voltage at the minus reference input of differential amplifier 120, or above a given threshold value relative thereto, whereby the output of differential amplifier 120 goes high and presents a high state to the minus reference input of differential amplifier 98 which is higher than any voltage the plus comparing input of differential amplifier 98, regardless of the position of potentiometer 102, whereby the output of differential amplifier 98 stays low and is disabled, and hence differential amplifier 52 is controlled solely by the tach voltage.

In the present invention, overspeed control circuitry 200, FIG. 3, outputs a signal on line 202 to AND gate 204 to enable or disable the timing pulses from comparator 48 to ignition power device 4. When output 202 is high, the timing pulses from comparator 48 are enabled through AND gate 204 to ignition power device 4, to enable running of the engine as above described. When output 202 is low, the timing pulses from comparator 48 are disabled and the output of AND gate 204 is low, disabling the ignition and preventing running of the engine. The disable signal at output 202 may alternatively be provided to a fuel supply control to disable the engine.

Figure 4:
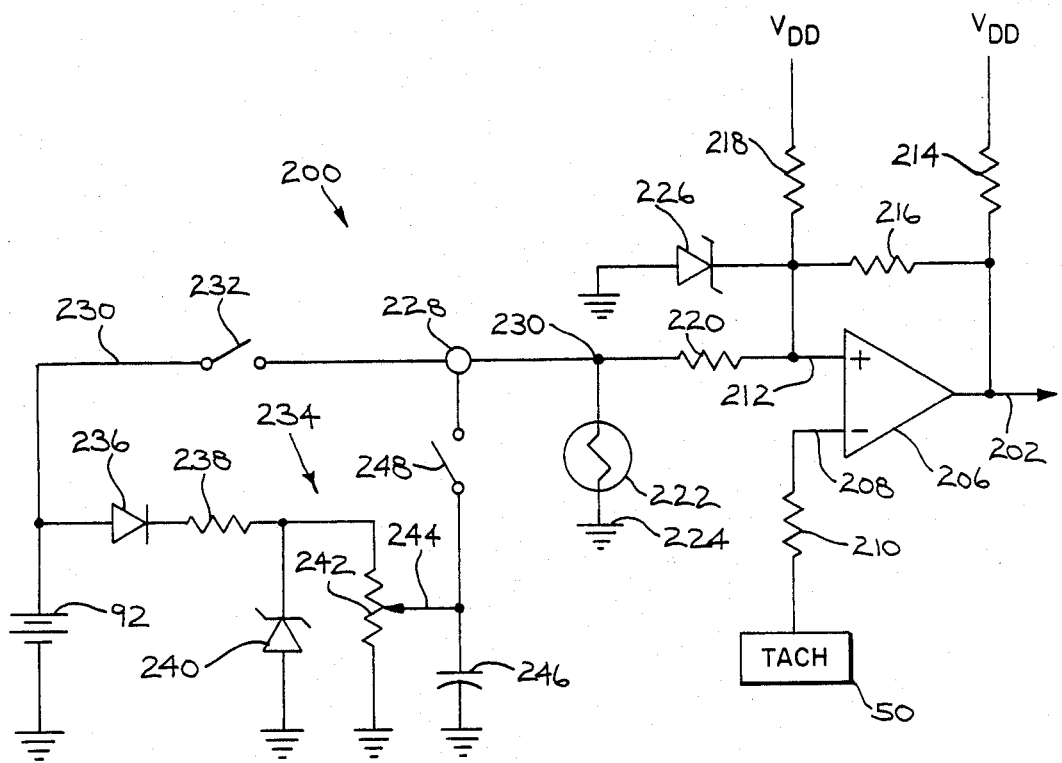
FIG. 4 is a circuit diagram of overspeed control circuitry in accordance with the invention.

Overspeed control circuitry 200, FIG. 4, includes a comparator 206 having an inverting input 208 connected through resistor 210 to tachometer 50, and having a noninverting input 212 connected to fixed voltage reference $V_{DD}$. Tachometer 50 outputs a voltage as a function of engine speed. When engine speed is below a given speed, the tachometer voltage at input 208 is less than the reference voltage at input 212, and comparator output 202 is high, which enables running of the engine as above described. Resistor 214 provides a pull-up resistor to voltage reference $V_{DD}$. Resistor 216 provides positive feedback to noninverting input 212 to provide sharp transitions when output 202 goes from low to high, to be described.

When engine speed increases above a given speed, the tachometer voltage at input 208 increases above the reference voltage at input 212, and comparator output 202 goes low, which disables the engine, as above described, and prevents running of the engine above the given speed. When engine speed drops below the given speed, the voltage at input 208 drops below that at input 212, and output 202 again transitions high, and again enables running of the engine.

A voltage divider network including resistors 218 and 220 and fuse 222 is connected between reference voltage source $V_{DD}$ and common ground reference at 224. The first branch of the voltage divider network includes resistor 218 connected between reference voltage source $V_{DD}$ and noninverting input 212 of comparator 206. A second branch of the voltage divider network includes resistor 220 and fuse 222 connected between noninverting comparator input 212 and common ground reference 224. Zener diode 226 limits the voltage at input 212 to a safe level. Fuse 222 has a normal closed-circuit condition completing a circuit from $V_{DD}$ through resistors 218 and 220 and through fuse 222 to ground reference 224, which in turn provides a given impedance at input 212. This given impedance sets the given threshold speed voltage for comparison against the tachometer voltage at input 208.

A terminal 228 is connected to a node 230 between resistor 220 and fuse 222. Terminal 228 enables the operator to apply a voltage to fuse 222 to blow the fuse to a permanent open-circuit condition. This increases the impedance at input 212, to increase the voltage thereat, such that tachometer voltage at input 208 can increase above the noted given value without comparator output 202 going low. This permits running of the engine above the noted given speed.

In one embodiment, fuse 222 is blown by applying voltage from boat battery 92 directly to terminal 228. Alternatively, boat battery voltage can be applied through a connection line 230 and a closed switch 232. If switch 232 remains closed, the voltage at input 212 is substantially increased, which in turn raises the overspeed limit even further, i.e. the voltage at input 212 from $V_{DD}$ is increased when fuse 212 is blown and the voltage at input 212 is further increased by battery 92. The tachometer voltage at input 208 must rise to this further increased level before comparator output 202 goes low to provide the noted disable signal.

In another embodiment, a variable voltage power supply 234 is connected to terminal 228 to blow fuse 222 and/or to vary the voltage at comparator input 212 after the fuse is blown, to vary the increased reference voltage at input 212 above which the tachometer voltage at input 208 must rise before comparator output 202 goes low to provide the disable signal. Voltage from boat battery 92 is provided through diode 236 and resistor 238 and limited by zener diode 240 and applied to potentiometer 242 having a wiper 244 operated by the operator to provide a variable voltage as filtered by capacitor 246 and supplied through closed switch 248 to terminal 228.

In one embodiment, switches 232 and 248 are normally open. When the operator wishes to defeat the overspeed protection, he closes switch 232, to blow fuse 222. The operator then opens switch 232 and closes switch 248 and moves wiper arm 244 to establish a new increased overspeed limit by variably increasing the voltage at comparator input 212.

Blowing of fuse 222 defeats the engine overspeed protection by defeating the disabling function of comparator 206 at the noted given speed, permitting running of the engine above the noted given speed. The new increased overspeed limit is set by the increased reference voltage at input 212 from $V_{DD}$, and any additional voltage supplied directly from battery 92 or from variable voltage power supply circuitry 234. The blowing of fuse 222 changes the impedance at comparator input 212 and leaves a permanent record of the noted defeat for subsequent detection. One merely connects a voltmeter between terminal 228 and ground reference 224 to detect the changed impedance.

It is recognized that various equivalents, alternatives and modifications are possible within the scope of the appended claims.

I claim:

1. Overspeed control circuitry for an internal combustion engine, comprising:
   disable means comprising engine speed responsive means responsive to engine speed above a given speed and disabling said engine to prevent running of said engine above said given speed;
   defeat means operable by the engine operator to defeat said disable means and permit running of said engine above said given speed and leaving a permanent record of said defeat for subsequent detection.

2. The invention according to claim 1 wherein said disable means has a given impedance, and wherein said defeat means permanently changes said impedance when operated by the operator to defeat said disable means, said changed impedance being subsequently detectable to indicate said defeat.

3. The invention according to claim 2 wherein said disable means has a reference voltage input for setting said given speed, and wherein said defeat means comprises means changing the impedance of said reference voltage input.

4. Overspeed control circuitry for an internal combustion engine, comprising:
   tachometer means outputting a voltage as a function of engine speed;
   reference voltage means;
   comparator means having a first input coupled to said tachometer means and a second input coupled to said reference voltage means and outputting a disable signal when the tachometer voltage increases above a given value relative to the reference voltage to disable the engine and prevent running of the engine above a given speed;
   fuse means connected in circuit with one of said inputs of said comparator means, said fuse means having a normally closed-circuit condition providing a first impedance at said one input such that the engine is prevented from running above said given speed;
   terminal means enabling the engine operator to apply a voltage to said fuse means to blow said fuse means to a permanent open-circuit condition providing a second impedance at said one input such that said tachometer voltage can increase above said given value without said comparator means outputting said disable signal, to permit running of the engine above said given speed.

5. The invention according to claim 4 wherein said fuse means is connected to said second input of said comparator means and increases the inpedance at said second input in said open-circuit condition of said fuse means to increase the voltage at said second input such that said tachometer voltage can increase above said given value without said comparator means outputting said disable signal.

6. The invention according to claim 5 wherein said fuse means is connected in series with a resistor and wherein the combination of said series connected fuse means and resistor is connected between said second input of said comparator means and a common ground reference, and wherein said terminal means is connected to a node between said fuse means and said resistor.

7. The invention according to claim 6 comprising variable voltage power supply means connected to said terminal means and operable by the operator to vary the voltage at said second input of said comparator means to vary the increased reference voltage above which said tachometer voltage must rise before said comparator means outputs said disable signal.

8. The invention according to claim 5 comprising a voltage divider network connected between said reference voltage means and a common ground reference, said voltage divider network having a first branch including a resistor connected between said reference voltage means and said second input of said comparator means, and having a second branch including a second resistor and said fuse means connected between said second input of said comparator means and said common ground reference, said second resistor and said fuse means being connected in series, and wherein said terminal means is connected to a node between said second resistor and said fuse means.

* * * * *